United States Patent Office 3,052,566
Patented Sept. 4, 1962

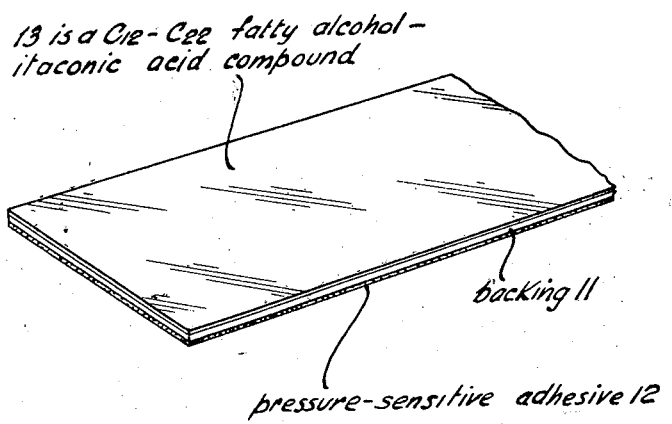

3,052,566
PRESSURE SENSITIVE ADHESIVE TAPE HAVING A RELEASE COATING OF FATTY ALCOHOL ITACONATE
Richard Myles Smith, New Brunswick, N.J., assignor to Johnson & Johnson, a corporation of New Jersey
Filed Nov. 20, 1959, Ser. No. 854,266
13 Claims. (Cl. 117—68.5)

This invention relates to the art of release coatings, and more particularly to a release coating containing a fatty alcohol itaconate, pressure-sensitive adhesive tapes having such release coatings, and the method of making such pressure-sensitive adhesive tapes.

The term "backing," as used herein, means any suitable material for supporting a pressure-sensitive adhesive.

The term "pressure-sensitive adhesive," as used herein, means an elastomeric material, such as a natural or synthetic rubber, with or without a resinous component, which provides a normally agressively tacky pressure-sensitive adhesive that can be applied with light finger pressure in the absence of heat and solvent.

The term "release coating," as used herein, means a thin coating applied to the opposite side of the backing from the side which carries the pressure-sensitive adhesive, or to a liner, to permit easy unwinding after being rolled or stacked with the release material in contact with the pressure-sensitive adhesive of a superimposed layer of tape or a label.

Pressure-sensitive tapes are usually wound in rolls, thus bringing the backing in one layer into contact with the pressure-sensitive adhesive coating on the layer thereabove. This has a tendency to cause the upper layer to adhere to the next lower layer, making it difficult to unwind the tape because of the aggressively tacky character of the pressure-sensitive adhesive.

Release coatings are therefore usually applied to the backing of pressure-sensitive tapes in order to permit easy unwinding of the tape, without detackifying the pressure-sensitive adhesive coating or splitting the backing.

Numerous attempts have been made to overcome these disadvantages, but many prior release coatings have been objectionable for various reasons. One very important reason is that after aging, especially at elevated temperatures, many release coatings lose their release properties. In other words, the release feature is fugitive. Examples of such release agents are paraffin wax coatings or emulsions.

Another objectionable feature in some prior art release coatings is that they lose their adhesiveness to the backing material and become detached therefrom, becoming attached to the pressure-sensitive side of the tape, and thereby lessening its adhesive characteristics, usually referred to as "detackification."

A further objection to some prior release coatings is inadequate heat stability and solvent resistance.

I have discovered that these and other disadvantages of prior art release coatings can be overcome, and a pressure-sensitive adhesive tape obtained, which will have good release characteristics and will not lose its release properties on aging and to which ink will adhere, by applying a thin coating of a fatty alcohol-itaconic acid film-former, such as stearyl- or cetyl-itaconate, or related materials, to the opposite side of the backing of pressure-sensitive tapes from the side which carries the pressure-sensitive adhesive.

It is therefore an object of this invention to provide a new and useful class of release coatings.

It is another object to provide pressure-sensitive tapes containing a normally agressively tacky pressure-sensitive adhesive on one side and a thin release coating on the opposite side, which will permit easy unwinding of the tape and not detackify the pressure-sensitive adhesive, nor be offset from the backing to the pressure-sensitive adhesive immediately thereabove.

It is also an object to provide a release coating which will have good ink adherence.

It is a further object to provide a method of making pressure-sensitive adhesive tapes which maintain effective release characteristics on aging for long periods of time, even though subjected to elevated temperatures.

With the above and other objects in view, which will be apparent as the description proceeds, I have set forth my invention in the following specification and have illustrated certain embodiments thereof in the following examples, but it will be understood that this disclosure is merely for the purpose of illustrating practical embodiments of the invention, and the latter is not to be limited thereto.

EXAMPLE 1.—TWO STEP PROCESS (a) *Esterification*

The following ingredients are mixed and refluxed 1 hour in a flask provided with a stirrer, thermometer, condenser and water trap:

| | Parts by weight |
|---|---|
| Itaconic acid | 39 (0.3 mol) |
| Stearyl alcohol | 82 (0.3 mol) |
| Toluene sulfonic acid | 1 |
| Toluene | 100 |

0.3 mol of water is given off and separated in the trap. The solution is then dried on an evaporating dish on a steam bath, and the residue is redissolved in 1 liter of hot methanol per 100 grams of residue. The hot methanol solution is decanted from any oily material which settles out and is then allowed to cool. The percipitate, which is monostearyl itaconate monomer, is filtered off and dried. It has a melting point of 85° C. The yield is 93%.

If steps are not taken to prevent it, a small amount of polymer may be formed and will settle out of the hot methanol solution in the oily precipitate. This can be prevented by the addition of 0.1% hydroquinone to the reaction mixture.

(b) *Polymerization*

The following mixture is heated on a steam bath for 8 hours:

| | Parts by weight |
|---|---|
| Monostearyl itaconate monomer | 51.7 |
| Benzoyl peroxide | 0.517 |
| Benzene | 2.6 |
| Ethyl ether | 0.7 |

0.7 part of ethyl ether is added dropwise to the mixture of the monomer and benzoyl peroxide, 1 drop being added every 20–30 seconds during the run to keep out air. Other methods may be used, however, such as flushing with nitrogen.

The benzene is added to improve heat transfer and hasten the melting of the monomer.

The product may be fractionated by dissolving in 334 parts of benzene and precipitating by pouring into 594 parts of acetone. The precipitated product, which is polymonostearyl itaconate, is filtered, washed with acetone and dried. It has a melting point of 45–75° C. The yield is 52%.

(c) *Release Coated Backing*

0.5 gram of the resulting polymonostearyl itaconate is dissolved in 49.5 grams of toluene and knife-coated onto a latex impregnated 27 pound kraft crepe paper that was coated with a nitrocellulose coating solution, at a weight of 0.3 ounce per square yard (dry weight). The latex is a mixture of 73 parts of Buna N (65/35), 25 parts of GRS, and 2 parts of a water-soluble phenolformaldehyde resin.

The opposite side of the backing is coated with 1.5–1.6 ounces per square yard of the following pressure-sensitive adhesive:

| | Parts by weight |
|---|---|
| Pale crepe rubber | 12.3 |
| GRS 1501 (Goodrich Gulf Chemical Company, Inc.) | 18.4 |
| Zinc Oxide | 17.8 |
| Santovar A (ditertiary amyl hydroquinone) (Monsanto Chemical Company) | 0.6 |
| Ionol (2,6-ditertiary-butyl-4-methylphenol) (Shell Chemical Corporation) | 0.6 |
| Amberol ST-137 (oil-soluble phenolformaldehyde and maleic-glyceride resins) (Rohm & Haas Company) | 4.1 |
| Schenectady resin ST–5010 (diethylene glycol ester of disproportionated rosin) (Schenectady Varnish Company, Schenectady, New York) | 46.1 |
| Versene (sodium salt of ethylenediamine-tetra-acetic acid) (Dow Chemical Company) | 0.16 |
| Total | 100.06 |

Adhesion to backing and tack tests were run on the release coated tape containing polymonostearyl itaconate in comparison with a similar tape without a release coating, with the following results:

| | Release-coated Tape | | Tape without Release Coating | |
|---|---|---|---|---|
| | After 1 day unaged | After 6 days at 150° F. (35% relative humidity) | After 1 day unaged | After 6 days at 150° F. (35% relative humidity) |
| Adhesion to Backing, ounces | 5.2 | 48.2 | 45.5 | 57.5 |
| Tack, grams | 529.2 | 398 | 547 | 483 |

Adhesion to backing and tack tests were also run on a similar release coated tape containing monostearyl itaconate monomer with the following results:

Release-coated tape after 1 day unaged
Adhesion to backing _____ ounces__ 21.3
Tack _____ grams__ 514.2

For testing purposes it is customary to use backings provided with the release coatings being tested in comparison with similar backings which have no release coating, but leaving off the adhesive. A test tape having the adhesive mass as part of its structure is applied to the release coated side of the backing. This practice was followed in the tests reported in this and the other examples.

EXAMPLE 2.—TWO STEP PROCESS (a) *Esterification*

The following ingredients are mixed and reacted as in Example 1:

| | Parts by weight |
|---|---|
| Itaconic acid | 39 (0.3 mol) |
| Adol 60 | 82 (0.26 mol) |
| Toluene sulfonic acid | 1 |
| Toluene | 100 |

The product was washed with toluene and acetone to remove any unreacted itaconic acid and Adol 60. 76.1 grams of Adol 60-itaconate, which is mainly monobehenyl itaconate, are recovered.

The Adol 60 used in this example is a fatty alcohol mixture made by Archer-Daniels-Midland Company, containing: 85% behenyl alcohol ($C_{22}$), and 15% stearyl alcohol ($C_{18}$).

(b) *Polymerization*

The following mixture is heated on a steam bath and nitrogen is bubbled through for 8 hours:

| | Parts by weight |
|---|---|
| Monobehenyl itaconate monomer | 50.3 |
| Benzoyl peroxide | 0.503 |
| Benzene | 2.6 |

The product is dissolved in 264 parts of hot benzene and precipitated by pouring into a liter of acetone. 42.4 parts of monobehenyl-itaconate polymer are obtained.

(c) *Release Coated Backing*

1 part of monobehenyl-itaconate polymer and 99 parts of warm toluene are knife-coated onto the nitrocellulose coated latex impregnated kraft paper backing described in Example 1. This was compared with a composition of 1 part of monobehenyl-itaconate monomer and 99 parts of hot toluene applied in the same manner to the same kind of backing.

The opposite side of the backing is coated with 1.5–1.6 ounces per square yard of the pressure-sensitive adhesive used in Example 1, and adhesion to backing and tack tests were run the next day with the following results:

| | Polymer | | Monomer |
|---|---|---|---|
| Adhesion to Backing, ounces | 11.2 | Unaged | 26.7 |
| Tack, grams | 604 | | 558 |

This example illustrates the use of a longer chain length fatty alcohol, and compares the results obtained from the monomer and polymer.

EXAMPLE 3.—ONE STEP PROCESS (a) *Esterification and Polymerization*

The following ingredients are mixed in an aluminum dish and heated on a hot plate at high heat until the melt stops bubbling (about 20 minutes):

| | | Parts by Weight |
|---|---|---|
| Itaconic acid | 1:1 mol ratio | 2.6 |
| Adol 64 | | 9.8 |

The resulting product was mainly monostearyl-itaconate polymer.

The Adol 64 used in this example is a fatty alcohol mixture made by Archer-Daniels-Midland Company, containing: 24.3% cetyl alcohol ($C_{16}$), 68.6% stearyl alcohol ($C_{18}$), 7.1% arachic alcohol, or n-eicosanol ($C_{20}$).

(b) *Release Coated Backing*

A 1% solution of the monostearyl-itaconate polymer in toluene is knife-coated onto the nitrocellulose coated latex impregnated kraft paper backing described in Example 1.

The opposite side of the backing is coated with 2.55 ounces per square yard of the following pressure-sensitive adhesive:

| | Pounds | Ounces |
|---|---|---|
| GRS 1022 (United States Rubber Company) | 31 | |
| Pure gum reclaim (Nearpara) | 43 | |
| Smoked sheet No. 1 (Imperial Commodities Company) | 12.5 | |
| Zinc Oxide RR (Royce Chemical Company) | 50.5 | |
| Schenectady Resin SP 559B (Schenectady Varnish Company) | 57 | |
| Ionol (2, 6-ditertiary-butyl-4-methylphenol) (Shell Chemical Corportation) | | 15 |
| Santovar A (ditertiary amyl hydroquinone) (Monsanto Chemical Company) | | 15 |
| EFED (triphenyl phosphite) (Monsanto Chemical Company) | 5 | |
| Tetraethylene pentamine (Union Carbide and Carbon Corportation) | 1 | |

Adhesion to backing and tack tests on a 1 day old unaged sample were as follows:

Adhesion to backing _____ ounces__ 1.2
Tack _____ grams__ 592

EXAMPLE 4.—ONE STEP PROCESS (a) *Esterification and Polymerization*

The following ingredients are mixed and reacted as in Example 3:

|  |  | Parts by Weight |
|---|---|---|
| Itaconic acid | } 1:1 mol ratio | 2.6 |
| Adol 52 | | 9.8 |

The resulting product was mainly monocetyl-itaconate polymer.

The Adol 52 used in this example is a fatty alcohol mixture made by Archer-Daniels-Midland Company, containing: 91.6% cetyl alcohol ($C_{16}$), 1.1% myristyl alcohol ($C_{14}$), and 7.3% stearyl alcohol ($C_{18}$).

(b) *Released Coated Backing*

A 1% solution of the monocetyl-itaconate polymer in toluene is knife-coated onto the nitrocellulose coated latex impregnated kraft paper backing described in Example 1.

The opposite side of the backing is coated with 2.55 ounces per square yard of the pressure-sensitive adhesive described in Example 3.

Adhesion to backing and tack tests on a 1 day old unaged sample were as follows:

Adhesion to backing _____ ounces__ 12.8
Tack _____ grams__ 584

EXAMPLE 5.—ONE STEP PROCESS (a) *Esterification and Polymerization*

The following ingredients are mixed and reacted as in Example 3, except that the hot plate is set at medium heat, and heated until the melt stops bubbling (about 18 minutes):

|  |  | Parts by Weight |
|---|---|---|
| Itaconic acid | } 1:2 mol ratio | 2.1 |
| Adol 64 (See Example 3) | | 7.9 |

The resulting product was distearyl-itaconate polymer.

(b) *Release Coated Backing*

A 1% solution of the distearyl-itaconate polymer in toluene is knife-coated onto the nitrocellulose coated latex impregnated kraft paper backing described in Example 1.

The opposite side of the backing is coated with 1.55 ounces per square yard of the pressure-sensitive adhesive described in Example 1.

Adhesion to backing and tack tests on a 2 day old unaged sample were as follows:

Adhesion to backing _____ ounces__ 8.2
Tack _____ grams__ 577

EXAMPLE 6

This example illustrates the utility of the invention as a printable backsize.

Some polymonostearyl itaconate, M.P. 45–75° C., made by the two step process of Example 1, is dissolved in toluene at a concentration of $\frac{1}{16}$%. The solution is then knife-coated on a flat impregnated paper backing which has previously been coated with nitrocellulose. After drying the release and tack retention are tested and found to be satisfactory using a tape coated with high adhesion mass of the following composition:

| Ingredient | Supplier | Percentage |
|---|---|---|
| Pale Crepe Rubber ("Air-Dri-Rub"). | Imperial Commodities | 31.79 |
| Aluminum Hydrate | Aluminum Co. of America | 18.42 |
| Polyterpene resin (Piccolyte S-115). | Harwick Std. Chemical Co. | 31.23 |
| Polyterpene resin (Piccolyte S-70). | _____do_____ | 9.54 |
| Tolylene diisocyanate | Monsanto Chemical Co. | 1.59 |
| Butyl phenolformaldehyde resin (Krumbhaar 1010). | Krumbhaar Chemicals | 1.83 |
| Santovar A (ditertiary amyl hydroquinone). | Monsanto Chemical Co. | 0.72 |
| Versene 67 (sodium salt of ethylenediamine-tetracetic acid). | Dow Chemical Co. | 2.70 |
| Ionol (2,6-ditertiary-butyl-4-methyl-phenol). | Shell Chemical Corp. | 0.91 |
| Lecithin (Clearate B70L) | Cleary Corp. | 1.27 |

Although Examples 1–6 are limited to the use of stearyl ($C_{18}$), cetyl ($C_{16}$), and behenyl ($C_{22}$) esters of itaconic acid, other fatty alcohol-itaconic acid reaction products, within the scope of those referred to in the next paragraph, including lauryl ($C_{12}$), may be used in the production of good release coatings by using approximately 1:1 or 1:2 molecular proportions of itaconic acid and fatty alcohol and obtaining similar results.

The fatty alcohol-itaconates which are useful in this invention are those made by the reaction of $C_{12}$ to $C_{22}$ fatty alcohols with itaconic acid.

These materials may be mono- or diesters and monomers or polymers.

The polymers have the following structure:

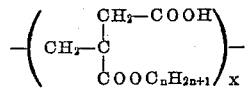

where $n$ is an integer from 12 to 22, and where, as indicated by viscosity data, X is in the range between 2 and 100, and preferably between 15 and 25. Higher values of X are operative provided the polymer has not become insoluble in the usual solvents, such as toluene, xylene, or methyl ethyl ketone.

The reaction products may be made by a 2-step process as indicated by Examples 1 and 2, or they may also be made by a 1-step bulk process as indicated by Examples 3, 4, and 5. In the former the itaconate monomer is formed first, and this is then polymerized in a second step to form the desired polymer. However, the bulk reaction is highly exothermic, and the 1-step process is only useful where there is adequate provision for the dissipation of heat.

Approximately at 1:1 mol ratio of itaconic acid and fatty alcohol is generally used where a monoester is desired, and approximately a 1:2 mol ratio is used where a diester is desired.

Although the polymerization in the above examples has been effected by the use of the benzoyl peroxide in nonaqueous solvent, and in bulk without catalyst, any of the other catalysts well-known in the art may be used in aqueous as well as nonaqueous media. These catalysts include organic peroxides, such as cumene hydroperoxide, diisopropyl benzene hydroperoxide, triisopropyl benzene hydroperoxide, tertiary butyl hydroperoxide, tertiary butyl perbenzoate and methyl cyclohexanehydroperoxide. They also include inorganic peroxy compounds, such as the perborates, persulfates, perphosphates, percarbonates, barium peroxide, zinc peroxide and hydrogen peroxide. Actinic radiation may also be used to catalyze polymerization.

The test procedure used for evaluating the release agents is as follows:

(1) Apply 1 inch wide tape to strips of backing.
(2) Place 4 strips in Carver laboratory press (without heat) and apply 2750 pounds' pressure for 15 minutes. Since the platen is 6 inches square, with four strips of tape the pressure is 114 pounds per square inch.
(3) Condition overnight at 72° F., 50% R.H.
(4) Attach free end of tape to spring balance mounted horizontally and having a maximum indicator.
(5) Holding the tape-backing assembly so that the tape is pulled off at a 180° angle, pull the backing from the tape as rapidly as possible without jerking.
(6) Record the maximum value indicated in ounces.
(7) Place the stripped tape lightly back on the same surface from which it was removed and save for tack tests.

The machine for measuring tack is a pendulum-type instrument in which the pendulum swings approximately 145°, lightly contacting the adhesive surface of the tape which is wrapped, adhesive side out, around a ring made from 5 mil cellulose acetate. The acetate ring, which is 1¼ inches in diameter and ½ inch wide, is mounted near the free end of a horizontal arm pivoted at the same point as the pendulum, and the free end rests on a spring balance which measures the vertical deflection of the horizontal arm. Therefore, as the pendulum starts to swing back after contacting the adhesive, it draws down the horizontal arm and deflects the spring balance an amount related to the tackiness of the tape.

The procedure for preparing the sample and measuring tackiness is as follows:

(1) Cut sample of tape to be tested 6 inches long and ½ inch wide.
(2) Wrap tape around plastic ring with the adhesive mass side out and secure by overlapping the ends of the tape. Tape should fit snugly around the ring but should not be tight enough to distort the ring. Do not touch that portion of the mass which will come in contact with the pendulum.
(3) Secure the plastic ring to the end of the horizontal arm which actuates the spring balance.
(4) Clean the contact surface on the pendulum with methyl ethyl ketone.
(5) Swing the pendulum to its highest position opposite the sample and secure it with the catch.
(6) Release the catch on the pendulum so that the pendulum swings down and up, contacting the tape on the ring. In swinging back, the pendulum will pull the ring and the horizontal arm and will thereby depress the spring balance an amount related to the tackiness of the tape.
(7) Record the maximum reading on the spring balance.

The fatty alcohol-itaconic acid coatings of this invention are applied from dilute solution in an organic solvent by any of the standard coating techniques, as by knife-coating, roller-coating, or calendering, after which the sheet is passed through a drying oven to remove solvent.

The concentration of the release agent in the organic solvent is preferably not over about 2%, and for most purposes is about 1%.

The backing to which my improved release agents are applied may be a kraft or rope saturating paper that has been impregnated with a latex mixture and then coated with a customary backsize solution (e.g. nitrocellulose), as in Examples 1 to 5, or it may be any of the conventional film-forming backing materials used in the art, such as cellophane, polyethylene terephthalate, cellulose acetate, vinyl chloride or ethyl cellulose, or a paper or cloth which is coated with an alkyd resin, vinyl chloride, nitrocellulose, or other normal plastic coating.

The thickness of the release coating may vary, but it is very thin, being in the neighborhood of 0.01 mil.

The normally tacky and pressure-sensitive adhesive may be of any of those used in the art, examples being compositions containing an elastomeric component, which is usually a natural or synthetic rubber, or similar elastomeric polymer, and a resinous component compatible with the binder and adapted to impart tack to the adhesive composition, together with suitable amounts of various types of additives, such as conventional fillers, antioxidants, etc.

It will therefore be apparent that the release coatings of this invention will anchor well to the customary base materials, and particularly to nitrocellulose-coated paper, have easy release properties which are retained even though subjected to elevated temperatures, and have good ink adherence. Furthermore, they do not impair the tackiness of the pressure-sensitive adhesive coating.

Although I have hereinbefore referred to pressure-sensitive adhesive tapes, it will be understood that this invention is not limited to tapes, but may be applied to labels or any materials having a layer of pressure-sensitive adhesive in contact with the release side of an interliner, or may release coatings may be applied to both sides of a liner adapted to be inserted between adjacent layers of pressure-sensitive adhesive tape or other material that has been coated with adhesive on both sides.

In the accompanying drawing, the FIGURE is a fragmental perspective view of a tape embodying the present invention. In this figure 11 is a backing, 12 is a pressure-sensitive adhesive applied to one side of the backing, and 13 is a $C_{12}$–$C_{22}$ fatty alcohol-itaconic acid compound.

It is apparent that many widely different embodiments of this invention may be made without departing from the spirit and scope thereof; and, therefore, it is not intended to be limited except as indicated in the appended claims.

I claim:

1. A pressure-sensitive adhesive tape comprising a backing selected from the group consisting of paper, cloth and film forming materials, a pressure-sensitive adhesive coated on one side of said backing, and on the opposite side of said backing a thin release coating consisting essentially of a $C_{12}$–$C_{22}$ fatty alcohol-itaconic acid compound.

2. The pressure-sensitive adhesive tape of claim 1, in which the fatty alcohol-itaconate is a monoester monomer.

3. The pressure-sensitive adhesive tape of claim 1, in which the fatty alcohol-itaconate is a diester monomer.

4. The pressure-sensitive adhesive tape of claim 1, in which the fatty alcohol-itaconate is a monoester polymer.

5. The pressure-sensitive adhesive tape of claim 1, in which the fatty alcohol-itaconate is a diester polymer.

6. The pressure-sensitive adhesive tape of claim 1, in which the fatty alcohol-itaconate is a monostearyl monomer.

7. The pressure-sensitive adhesive tape of claim 1, in which the fatty alcohol-itaconate is a distearyl monomer.

8. The pressure-sensitive adhesive tape of claim 1, in which the fatty alcohol-itaconate is a monostearyl polymer.

9. The pressure-sensitive adhesive tape of claim 1, in which the fatty alcohol-itaconate is a distearyl polymer.

10. The pressure-sensitive adhesive tape of claim 1, in which the fatty alcohol-itaconate contains the following structure:

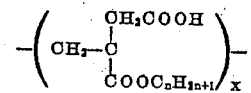

where $n$ is an integer from 12 to 22, and where X is from 2 to 100.

11. The method of making a pressure-sensitive adhesive tape having good release characteristics when rolled upon itself, which comprises coating a pressure-sensitive adhesive onto one side of a backing selected from the group consisting of paper, cloth and film forming materials thereof with a pressure-sensitive adhesive, and coating the other side of said backing with a thin release coating consisting essentially of a $C_{12}$–$C_{22}$ fatty alcohol-itaconic acid film-former.

12. The method of claim 11, in which the release coating is applied from a solution containing not over about 2% of the release agent in an organic solvent.

13. The method of claim 12, in which the organic solvent is toluene.

References Cited in the file of this patent

UNITED STATES PATENTS

| 2,672,446 | Mixon et al. | Mar. 16, 1954 |
| 2,913,355 | Collins | Nov. 17, 1959 |

FOREIGN PATENTS

| 210,771 | Australia | Jan. 24, 1957 |
| 666,990 | Great Britain | Feb. 20, 1952 |